(12) United States Patent
Sadovsky et al.

(10) Patent No.: US 8,112,116 B2
(45) Date of Patent: *Feb. 7, 2012

(54) BIDIRECTIONAL DYNAMIC OFFLOADING OF TASKS BETWEEN A HOST AND A MOBILE DEVICE

(75) Inventors: Vladimir Sadovsky, Redmond, WA (US); Robin A. Alexander, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/105,788

(22) Filed: May 11, 2011

(65) Prior Publication Data

US 2011/0214126 A1    Sep. 1, 2011

Related U.S. Application Data

(63) Continuation of application No. 11/670,891, filed on Feb. 2, 2007, now Pat. No. 7,966,039.

(51) Int. Cl.
*H04L 12/12* (2006.01)

(52) U.S. Cl. ........ 455/557; 455/558; 709/227; 717/174; 717/176; 717/178

(58) Field of Classification Search .................. 455/557, 455/558; 709/227; 717/174, 176, 178
See application file for complete search history.

(56) References Cited

U.S. PATENT DOCUMENTS

| | | | | |
|---|---|---|---|---|
| 5,222,062 A | * | 6/1993 | Sharma et al. | 370/218 |
| 5,280,586 A | * | 1/1994 | Kunz et al. | 710/2 |
| 5,319,754 A | * | 6/1994 | Meinecke et al. | 710/52 |
| 5,469,545 A | * | 11/1995 | Vanbuskirk et al. | 709/234 |
| 5,546,538 A | | 8/1996 | Cobbley et al. | |
| 5,566,326 A | | 10/1996 | Hirsch et al. | |
| 5,572,711 A | * | 11/1996 | Hirsch et al. | 703/26 |
| 5,664,098 A | * | 9/1997 | Bianchi et al. | 726/16 |
| 5,943,692 A | | 8/1999 | Marberg et al. | |
| 6,151,709 A | * | 11/2000 | Winkel | 717/173 |
| 6,314,447 B1 | | 11/2001 | Lea et al. | |
| 6,336,142 B1 | | 1/2002 | Kato et al. | |
| 6,539,481 B1 | | 3/2003 | Takahashi et al. | |
| 6,990,662 B2 | * | 1/2006 | Messer et al. | 717/174 |
| 7,366,460 B2 | | 4/2008 | O'Farrell et al. | |
| 7,418,344 B2 | * | 8/2008 | Holtzman et al. | 701/301 |
| 7,554,992 B2 | | 6/2009 | Kimura et al. | |
| 2001/0054115 A1 | | 12/2001 | Ferguson et al. | |
| 2003/0158906 A1 | | 8/2003 | Hayes et al. | |
| 2003/0161327 A1 | | 8/2003 | Vlodavsky et al. | |
| 2004/0003112 A1 | | 1/2004 | Alles et al. | |

(Continued)

FOREIGN PATENT DOCUMENTS

CN    1790263    6/2006

(Continued)

OTHER PUBLICATIONS

Gurun, Selim et al.; "NWSLite: A Non-Parametric Prediction Utility for Resource-Restricted Devices"; 2005.

(Continued)

*Primary Examiner* — Jinsong Hu
*Assistant Examiner* — Qun Shen

(57) ABSTRACT

One or more functions are exposed by a mobile device to a host connected to the mobile device. A function of the one or more functions is executed at the mobile device in response to a request from the host, wherein the function is associated with a host task. The result of the function is returned to the host.

19 Claims, 9 Drawing Sheets

U.S. PATENT DOCUMENTS

| | | | |
|---|---|---|---|
| 2004/0243515 A1* | 12/2004 | Kurihara et al. | 705/41 |
| 2005/0102125 A1* | 5/2005 | Tseng | 703/14 |
| 2005/0120219 A1 | 6/2005 | Munetoh et al. | |
| 2005/0125784 A1 | 6/2005 | Yang et al. | |
| 2005/0278459 A1 | 12/2005 | Boucher et al. | |
| 2006/0075408 A1 | 4/2006 | Powers et al. | |
| 2006/0095754 A1 | 5/2006 | Hyder et al. | |
| 2006/0095953 A1 | 5/2006 | Frank | |
| 2006/0235998 A1 | 10/2006 | Stecher et al. | |
| 2006/0271441 A1* | 11/2006 | Mueller et al. | 705/14 |
| 2006/0280166 A1* | 12/2006 | Morris | 370/352 |
| 2007/0143851 A1 | 6/2007 | Nicodemus et al. | |
| 2007/0168586 A1 | 7/2007 | Sadovsky et al. | |
| 2008/0052770 A1* | 2/2008 | Ali et al. | 726/9 |
| 2010/0272258 A1 | 10/2010 | Sadovsky et al. | |

FOREIGN PATENT DOCUMENTS

| | | |
|---|---|---|
| KR | 100642998 | 11/2006 |
| WO | WO03/065260 | 8/2003 |

OTHER PUBLICATIONS

Microsoft Technet; "IPSec troubleshooting tools"; retrieved from the Internet on Nov. 8, 2006; last updated on Jan. 21, 2005.

Luca, Octavian et al.; "PDAs: An Overview"; 2000.

Curran, Kevin et al.; "Optimal Streaming of Multimedia to Mobile Devices"; 2004.

Russel, Charlie; "Windows Vista Performance Enhancements"; retrieved from the Internet on Jan. 26, 2007.

PCT Patent Application PCT/US2008/050866; International Search Report and Written Opinion; Apr. 30, 2008 (MS #318202.02).

CN Patent Application 200880003900.4; First Office Action and English translation; Sep. 7, 2010.

CN Patent Application 200880003900.4; Second Office Action and English translation; Apr. 13, 2011.

* cited by examiner

| NAME | ARGUMENT(S) | RETURN |
|---|---|---|
| ENCRYPT_1 | DATA BLOCK (0-100 KB), KEY (128b) | DATA BLOCK (0-100 KB) |
| DECRYPT_1 | DATA BLOCK (0-100 KB), KEY (128b) | DATA BLOCK (0-100 KB) |
| ENCRYPT_2 | DATA BLOCK (0-400 KB), KEY (128b) | DATA BLOCK (0-400 KB) |
| DECRYPT_2 | DATA BLOCK (0-400 KB), KEY (128b) | DATA BLOCK (0-400 KB) |
| ..... | ..... | ..... |

FIG. 7

BIDIRECTIONAL DYNAMIC OFFLOADING OF TASKS BETWEEN A HOST AND A MOBILE DEVICE

CROSS-REFERENCE TO RELATED APPLICATIONS

This patent application is a continuation of, and claims priority from, U.S. patent application Ser. No. 11/670,891 filed on Feb. 2, 2007, which is incorporated herein by reference in its entirety.

BACKGROUND

Today's mobile devices often have advanced processing power and specialized circuitry. An example of such specialized circuitry includes a Digital Signal Processor (DSP) in a mobile phone. Mobile devices may be connected to a host, such as a personal computer, for exchanging data between the mobile device and the host. However, current designs do not consistently allow for host workflows to be performed by the computational resources of a connected mobile device and in cases of traditionally constrained devices (like flash memory drives) make it almost impossible.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention provide offloading of tasks between a host and a mobile device. In one embodiment, a host may use a function of a mobile device to perform host tasking. The processing power and dedicated circuitry of a connected mobile device may be exploited by the host system to optimize the workflow of the host system. In another embodiment, a mobile device may offload device tasking to a host.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

FIG. 7 is an array for exposing device functions in accordance with an embodiment of the invention.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
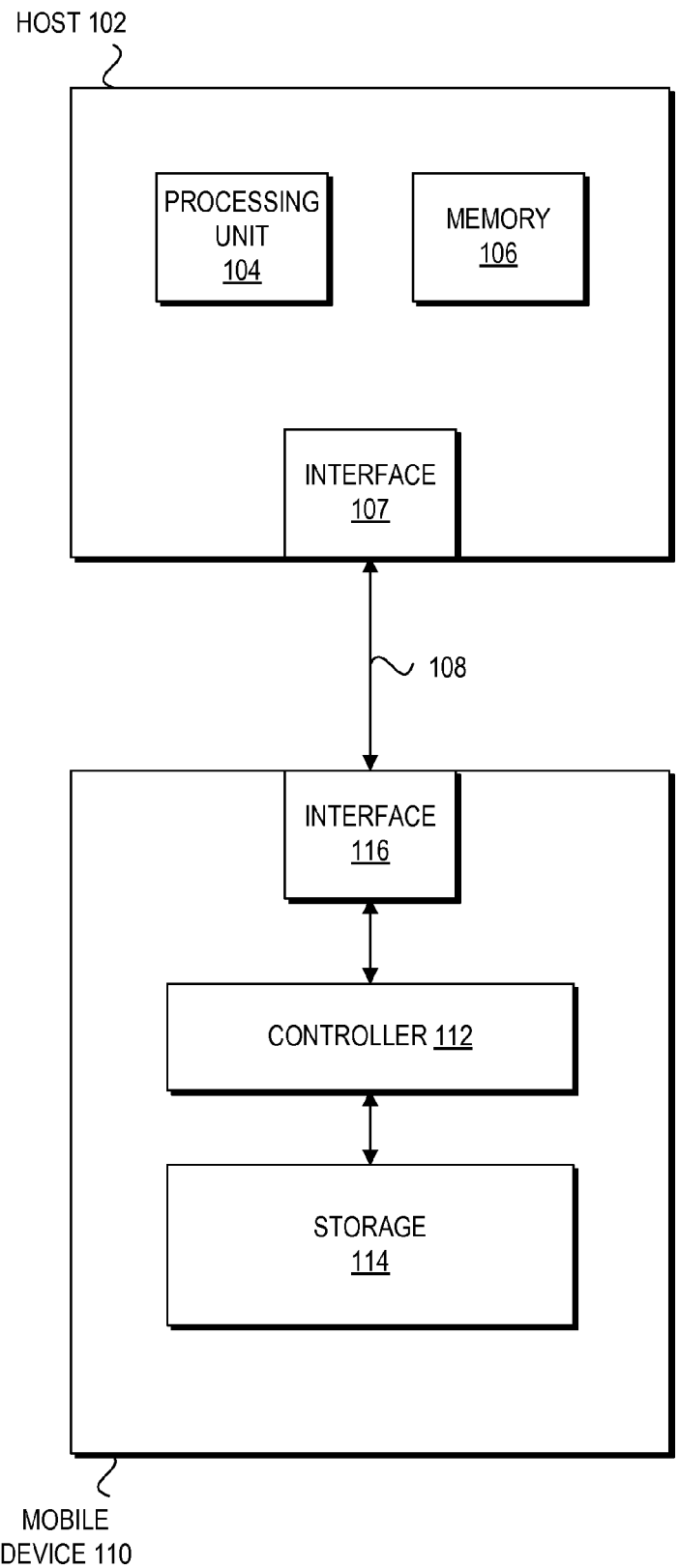
FIG. 1 is a block diagram of a host connected to a mobile device in accordance with an embodiment of the invention.

FIG. 1 and the following discussion are intended to provide a brief, general description of a suitable computing environment to implement embodiments of the invention. The operating environment of FIG. 1 is only one example of a suitable operating environment and is not intended to suggest any limitation as to the scope of use or functionality of the operating environment. Although not required, embodiments of the invention will be described in the general context of "computer readable instructions" being executed by one or more computing devices. Computer readable instructions may be distributed via computer readable media. Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 1 shows a host 102 connected to mobile device 110 via connection 108. Host 102 may include any computing device such as a desktop, laptop, and the like. Host 102 may include other computing devices such as a camera, media player, mobile phone, and the like. In one embodiment, mobile device 110 may include a free standing mobile device, such as a mobile phone, a media player, and the like. In another embodiment, mobile device 110 may include a host-dependent mobile device, such as a Universal Serial Bus (USB) Flash Drive, a memory card, a security card, and the like. As used herein, "host-dependent" refers to a mobile device that may not be utilized unless the mobile device is connected to a host. As used herein, "host" refers to a computing device that manages another computing device. The computing device controlled by the "host" is referred to as the "device." This host/device relationship may also be referred to as a master/slave relationship.

Embodiments of the invention may be used with short-lived tasks invoked on demand. In one example, a personal computer (host) may offload complex cryptography computations to a storage device having cryptography dedicated circuitry. In general, cryptography may be performed much faster in hardware than by software instructions executed by a processor. Further, cryptography performed by the dedicated circuitry is usually more secure than software instructions and dedicated circuitry may be required for using some cryptography algorithms (e.g., government use).

In another example, a personal computer (host) may offload digital rights management computations or media content watermarking to a connected device (such as a digital camera). The digital camera may include dedicated circuitry or special routines that may be more efficient than the personal computer in performing these media related tasks.

Connection 108 may include a wired or a wireless connection between host 102 at interface 107 and mobile device 110 at interface 116. In one embodiment, host 102 and mobile device 110 are in close proximity to one another as part of a user's Personal Area Network (PAN). Examples of connection 108 include USB (wired or wireless), firewire (IEEE 1394), radio frequency (e.g., Bluetooth, Wi-Fi, etc.), infrared, and the like.

In one embodiment, a mobile device may be host-capable and serve as a host in some scenarios. For example, a mobile phone may act as mobile device 110 connected to a laptop computer acting as host 102. In another example, the same mobile phone may act as host 102 connected to a memory card acting as mobile device 110. In this example, the memory card is a host-dependent mobile device.

Host 102 may include a processing unit 104 and memory 106. Host 102 also includes an interface 107 for inputting/outputting data from host 102. Host 102 may also include a storage device, such as a Hard Disk Drive or flash memory (not shown).

Mobile device 110 may include a controller 112 coupled to storage 114. Controller 112 may manage the reading/writing of data on storage 114 as well as perform other functions. Storage 114 may include a magnetic disc drive, an optical drive, non-volatile storage, such as flash memory, and the like.

From the viewpoint of host 102, mobile device 110 is considered a transient device. Mobile device 110 may be connected/disconnected from host 102 without warning to host 102. It will be appreciated that mobile device 110 may be connected/disconnected from host 102 without restarting host 102. The transient nature of mobile device 110 leads to the dynamic aspect of embodiments herein. Host 102 may take advantage of the processing capabilities of mobile device 110 when the mobile device is present, but when mobile device 110 is disconnected, the host 102 simply notes the unavailability of the device for completing host tasking. Failover handling of situations when mobile device 110 is disconnected from host 102 before an offloaded task is completed is discussed below. Also, in some embodiments, tasks of mobile device 110 may be offloaded to host 102 for completion. Thus, the offloading of tasks between host 102 and mobile device 110 may be bi-directional.

Figure 2:
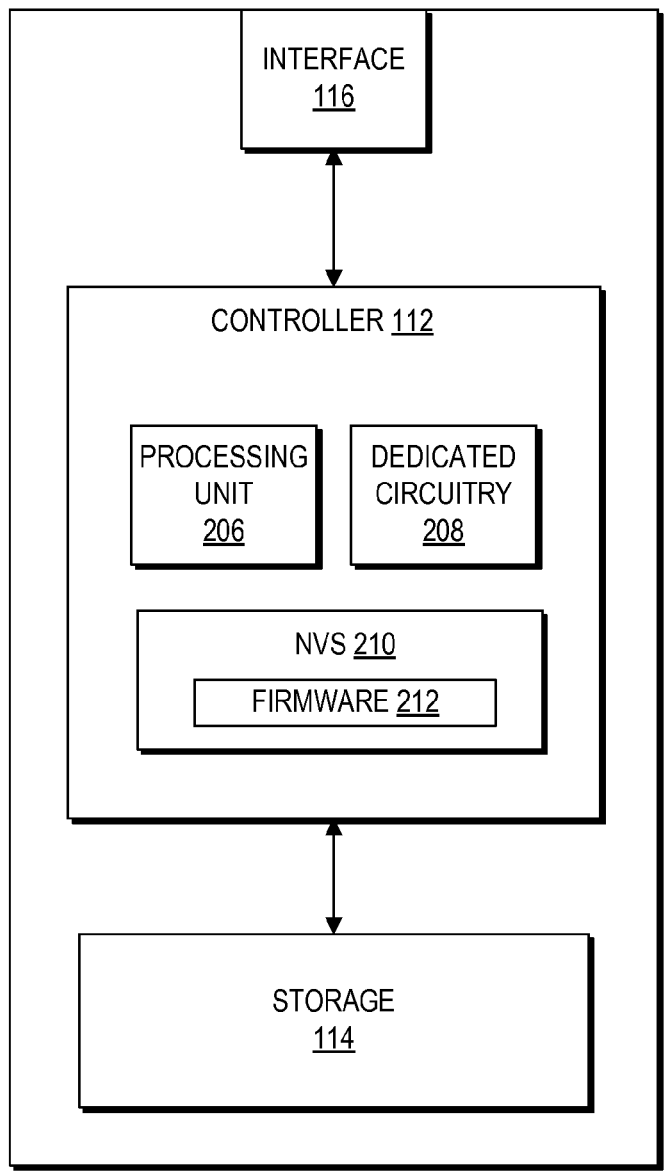
FIG. 2 is a block diagram of a mobile device in accordance with an embodiment of the invention.

Turning to FIG. 2, an embodiment of mobile device 110 is shown. Mobile device 110 may include a smart storage device such as a USB Flash Device (UFD), a memory card, and the like. In one embodiment, a smart storage device is host-dependent for operability. Mobile device 110 may also include free-standing devices such as media players, mobile phones, Personal Digital Assistants (PDAs), and the like.

Controller 112 may include a processing unit 206 and non-volatile storage (NVS) 210. Processing unit 206 may include a general processor, such as a 32-bit Reduced Instruction Set Computing (RISC) processor. While a single processing unit 206 is shown, embodiments of mobile device 110 may include multiple processing units such as multiple processors, multiple cores, and the like.

In one embodiment, NVS 210 has stored firmware 212 that may be executed by processing unit 206. Firmware 212 may include an operating system (such as a Real-Time Operating System (RTOS)), one or more applications, and the like, for mobile device 110. Firmware 212 may also include instructions for executing embodiments of the invention.

In the embodiment of FIG. 2, controller 112 includes dedicated circuitry 208. Dedicated circuitry 208 includes hardware that may perform specialized operations. Examples of dedicated circuitry 208 include an Application-Specific Integrated Circuit (ASIC), a Field Programmable Logic Array (FPLA), Field Programmable Gate Array (FPGA), and the like. Functionality performed by dedicated circuitry 208 may include cryptography, digital signal processing, digital rights management, and the like. Embodiments herein enable host 102 to utilize the functionality of dedicated circuitry 208 for more efficiently completing host workflows.

Figure 3:
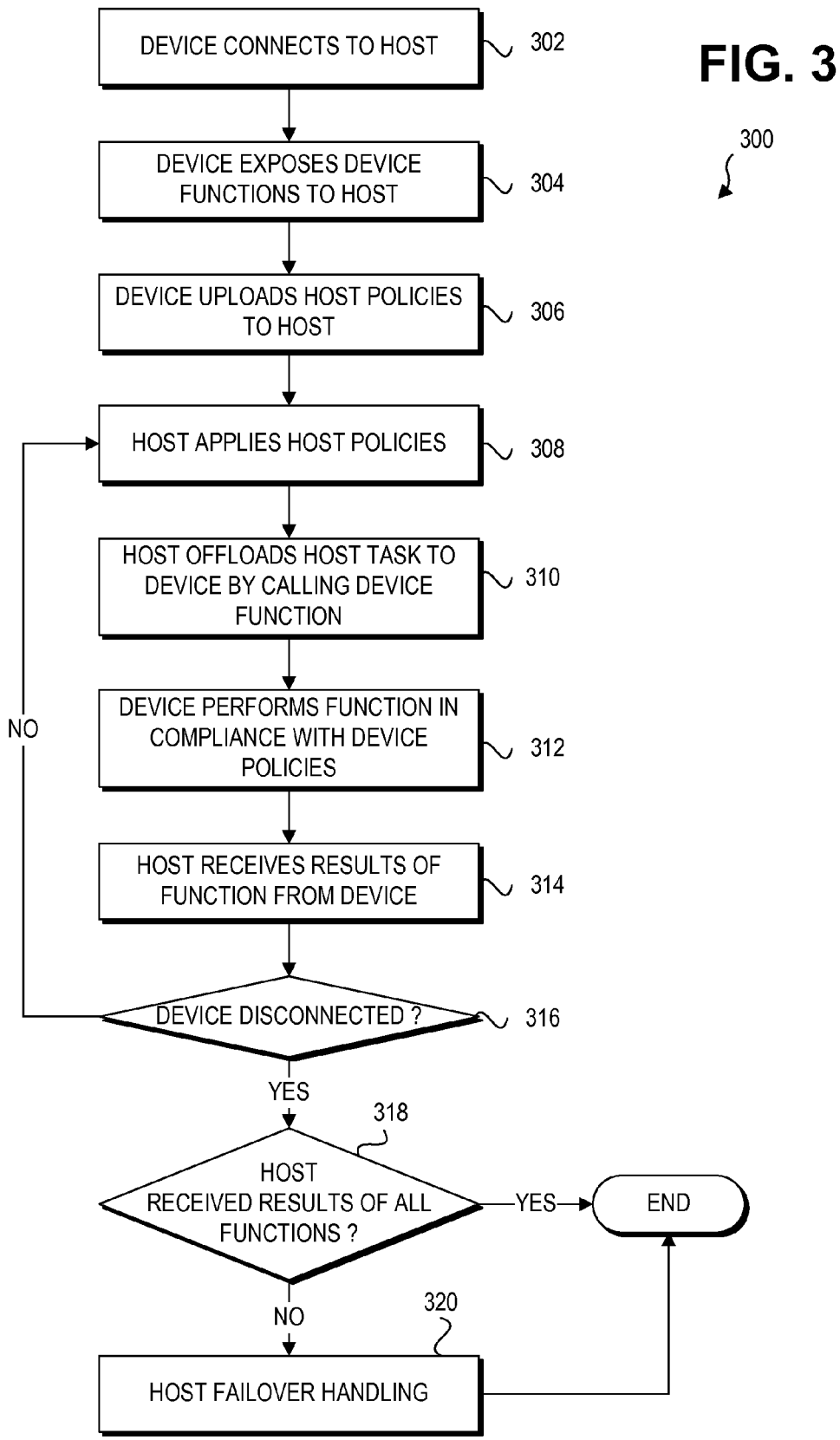
FIG. 3 is a flowchart showing the logic and operations of a host offloading a task to a mobile device in accordance with an embodiment of the invention.

Turning to FIG. 3, a flowchart 300 shows the logic and operations of offloading tasks from a host to a mobile device in accordance with an embodiment of the invention. Flowchart 800 of FIG. 8 (discussed below) shows embodiments where device tasks are offloaded to the host for the host to complete. It will be understood that at least some of the logic of flowcharts 300 and 800 may occur at the same time. In other words, in some instances, host 102 may offload tasks to mobile device 110 while at the same time mobile device 110 offloads tasks to host 102. Thus, the offloading of tasks between host 102 and mobile device 110 may be bi-directional.

In one embodiment, the logic of flowchart 300 occurs during a session when the mobile device is connected to the host. A single session begins when the mobile device is connected to the host and ends when the mobile device is disconnected from the host. From the perspective of the host, the mobile device is transient and the presence of the mobile device is unpredictable. Further, the length of any session with the mobile device is unpredictable and the time between sessions is also unpredictable. As discussed below, embodiments of the invention cope with the transient nature of the mobile device when offloading host tasks.

Starting in block 302, a mobile device connects to a host. The connection may be via wired connection or a wireless connection. In one embodiment of the invention, the host does not need prior knowledge of the mobile device or task offloading in order to implement embodiments of the invention. This may be the first time the host has seen the mobile device. The mobile device may provide the host the means for offloading tasks to the mobile device. In one embodiment, setting up the connection may include establishing a secured communication session between the host and the mobile device.

In one example, the mobile device may be used with a public host, such a public computer at a kiosk. For example, a user wishes to use a public computer at an airport to check email on the user's corporate network. However, the connection requires a certain cryptography algorithm that is not supported by the public computer or may take too long to execute by the limited processing capabilities of the public computer. The user may connect their USB Flash Drive (UFD) (that contains dedicated cryptography circuitry) to the public computer. With embodiments herein, the public computer may use the dedicated cryptography circuit of the UFD to connect to the user's corporate network. In this example, all footprints of the session with the public host may be removed when the session ends.

Proceeding to block 304, the mobile device exposes its functions to the host. In one embodiment, the mobile device functions are exposed as interfaces that may be utilized by the host. For example, the mobile device may expose an ENCRYPT interface that will encrypt a block of data for the host. Embodiments of exposing device functions are discussed below in connection with FIGS. 4-7.

Continuing to block 306, the mobile device uploads host policies to the host for offloading host tasks. In one embodiment, this may be the first connection between the host and the mobile device and the host may not have stored host policies. Also, by providing the host with default host policies, prior knowledge of task offloading by the host is not necessary to carry out embodiments of the invention.

Continuing to block 308, the host applies host policies. In one embodiment, the host has received polices from the mobile device as described in block 306. In another embodiment, the host may have already stored host policies or have stored host policies from a previous session with the mobile device. In yet another embodiment, the host may acquire (and then merge with any policies already stored on the host) host policies from a central server in a managed network. For example, a managed network may want to push the same policy to all (or groupings of) managed hosts. Alternatively, policy stored at a central server may be tailored for each particular host. Also, the ability to update the policy at a central server location would ease system administration of the managed network.

As used herein, a "host task" refers to a computational task to be performed by the host. When a mobile device is connected, the host policies determine whether execution of a host task may be performed by a function exposed by the mobile device. In general, one or more device functions may be used to complete a host task.

For example, a host task may be to encrypt a text document of 500 KB using encryption algorithm A. The mobile device has exposed a function that will encrypt 100 KB blocks of data using encryption algorithm A with dedicated circuitry. The host may complete the host tasking of encrypting the text document by calling the device function 5 times to complete the host tasking.

In one embodiment, multiple functions may be called in the form of a batch using a script language executable by the mobile device. The mobile device would have knowledge of the batch language and be able to execute the batch language for executing multiple functions.

Host polices control offloading of tasks to the mobile device. For example, a host policy may be "if a device with encryption algorithm A is present, then offload algorithm A encryption tasks to the device." The host polices may be modifiable by a user or a system administrator. In one embodiment, host policies may be associated with an administrative polices, such as security. For example, the host may not offload tasks until the mobile device can be authenticated.

In another embodiment, host policies may be associated with host performance issues. For example, tasks will be offloaded where a significant increase in performance is expected (e.g., above some threshold). In another example, a task that is relied upon for a lengthy series of follow-on tasks may not necessarily be offloaded. This is because of the expected transient nature of the mobile device. If the mobile device is disconnected while the mobile device is still performing the task, then the host will not receive the results of the offloaded task. In this instance, the host may have to perform the task itself from the beginning, and thus, waste time.

In another embodiment, host policies may monitor the health of the mobile device. The host may monitor performance factors of the mobile device such as processor load, available memory space, and the like. Another mobile device health indicator may include execution time of an offloaded task. Host policies may suspend host task offloading until mobile device health improves.

Proceeding to block 310 of flowchart 300, the host offloads a task to the mobile device by calling one or more exposed mobile device functions as described in block 304. As discussed further below, in one embodiment, these functions may be exposed as interfaces, such as APIs, to applications and the operating system.

In an alternative embodiment, the host may offload a task by downloading an executable image or an intermediate language to the mobile device. For example, the offloaded task may include an executable routine written in a platform neutral language. The mobile device may advertise support for the platform neutral language during the connection handshake. The device driver on the host may download the executable routine to the mobile device when needed (i.e., on the fly). The return of the completed task may also be handled by the device driver. In another example, the intermediate language may include an interpreted language that may be run using an interpreter on the host or a compatible interpreter on the mobile device.

While flowchart 300 shows an embodiment of offloading one task from the host, it will be appreciated that more than one task may be offloaded to the mobile device at one time. It will also be understood that one or more tasks may be offloaded at different times to the mobile device without regards to when results of the tasks are returned to the host. These embodiments (and others) may be implemented through the host polices. For example, task A may be offloaded at time T1 and task B offloaded at time T2. The execution of tasks A and B may occur without regard to the other. Also, tasks A and B may not even be associated with each other. For example, task A may be related to encrypting data for storage on the mobile device and task B may be related to signal processing of a Wi-Fi signal by the DSP of the mobile device.

Continuing to block 312, the mobile device performs the function in compliance with mobile device policies. A mobile device's policies may be related to security, administrative items, and the like. For example, a mobile device may need to authenticate the host before performing any offloaded task requests. In another example, a UFD may include crypto hardware for use by a government agency. The host may request use of the crypto hardware for encrypting an email being sent from a user's personal non-government email (e.g., a Hotmail account). The mobile device may have a policy of only encrypting email being sent from (or to) a government email address because the encryption algorithm is classified. Because of this policy, the mobile device may refuse to perform the encryption for the user's personal email. In one embodiment, device policies may be updated when connected to a host, such as an administrative host. The updated device policies may then be enforced by the device in future task offloading from the currently connected host or other hosts.

Mobile device polices may also indicate if particular mobile device activities take precedent over host task offloading. For example, if the device is a mobile phone, when a call arrives for the mobile phone, any DSP activity for the host is suspended until the phone call for the mobile phone is completed.

Continuing to block 314, the host receives the results of the function from the mobile device. The results may be in any appropriate form such as Boolean, integer, floating-point integer, string, and the like. For example, the mobile device may expose an encryption function with two parameters: 100 KB data block to encrypt and a key. The mobile device performs the encryption and returns an encrypted data block to the host. The host may then use the encrypted block as desired (e.g., save on local storage, send to network storage, send as email, etc.).

Proceeding to decision block 316, the logic of flowchart 300 determines if the mobile device has been disconnected. In one embodiment, the logic of flowchart 300 is alerted by the host OS when the mobile device is removed using well known methods. If the answer to decision block 316 is no, then the logic returns to block 308 to offload another task to the mobile device from the host. Flowchart 300 may repeatedly loop through blocks 308-316 offloading tasks from the host to the mobile device until the mobile device is disconnected from the host.

If the answer to decision block 316 is yes, then the logic continues to decision block 318. At decision block 318, the logic determines if the host has received results from all called functions. Since the mobile device is transient in nature, the mobile device may be removed at anytime while the host is running. Thus, the mobile device may be removed when the host is still waiting for results of an offloaded task.

If the answer to decision block 318 is yes, then flowchart 300 ends. If the answer to decision block 318 is no, then the logic proceeds to block 320 for performing failover handling by the host. In one embodiment, the host inventories the task(s) that did not complete before the mobile device was disconnected. The function(s) associated with these incomplete task(s) will then be completed by the host. These tasks may be re-started and performed by the host or may be offloaded to another mobile device that is connected to the host and supports task offloading as described herein. After block 320, flowchart 300 ends.

Figure 4:
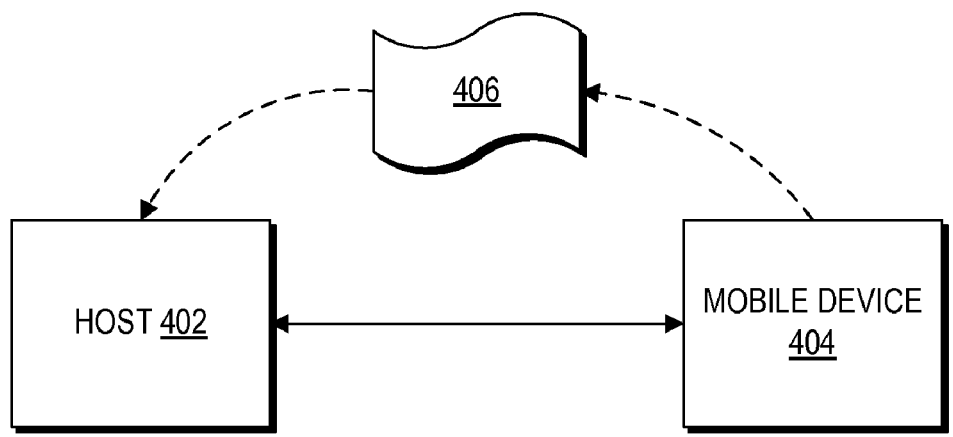
FIG. 4 is a block diagram of exposing device functions in accordance with an embodiment of the invention.

Turning to FIG. 4, an embodiment of exposing functions by the mobile device to the host is shown. In FIG. 4, a host 402 is connected to a mobile device 404. In order to expose its available functions, mobile device 404 sends a software module 406 (executable on the host) stored on mobile device 404 to host 402.

In one embodiment, software module 406 includes one or more interfaces, such as APIs, that may be used by host 402. In one embodiment, the APIs may be exposed to host 402 as a library of Component Object Model (COM) objects for use by applications and/or an OS operating on host 402. The use of the mobile device for executing the APIs may be transparent to the applications and/or OS. The APIs would divert computations to the mobile device. In other embodiments, software module 406 may include language neutral objects, such as Java® objects, Common Language Runtime (CLR) objects, and the like.

In one embodiment, when mobile device 404 is disconnected from host 402, the APIs of software module 406 are marked as unavailable from host 402. In this way, software executing on host 402 will not attempt to call APIs that are no longer available since mobile device 404 has been disconnected. In alternative embodiments, uploaded software module 406 is purged from host 402 after mobile device 404 is disconnected.

In one embodiment, host 402 may authenticate software module 406. Such authentication techniques may include use of a certificate, a signature, and the like. In other embodiments, software module 406 may need to be digitally signed to be recognized and loaded in accordance with host policies.

Figure 5:
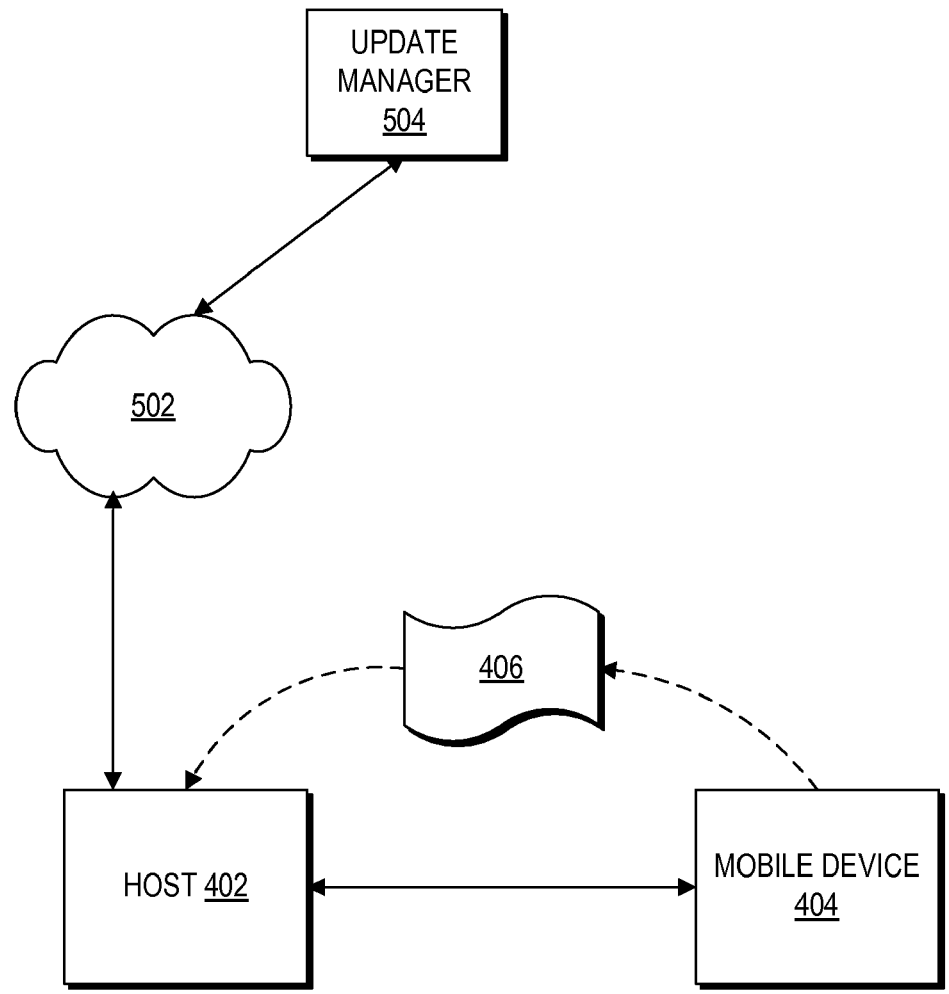
FIG. 5 is a block diagram of exposing device functions in accordance with an embodiment of the invention.

FIG. 5 shows one embodiment of authenticating software module 406. In FIG. 5, host 402 may contact an update manager 504 via network 502. Update manager 504 may authenticate software module 406 and may offer updates to software module 406 to host 402. In one embodiment, updates to software module 406 received by host 402 may also be used to update software module 406 stored on mobile device 404. In one embodiment, the update manager 504 may include Microsoft Windows® Update.

Figure 6:
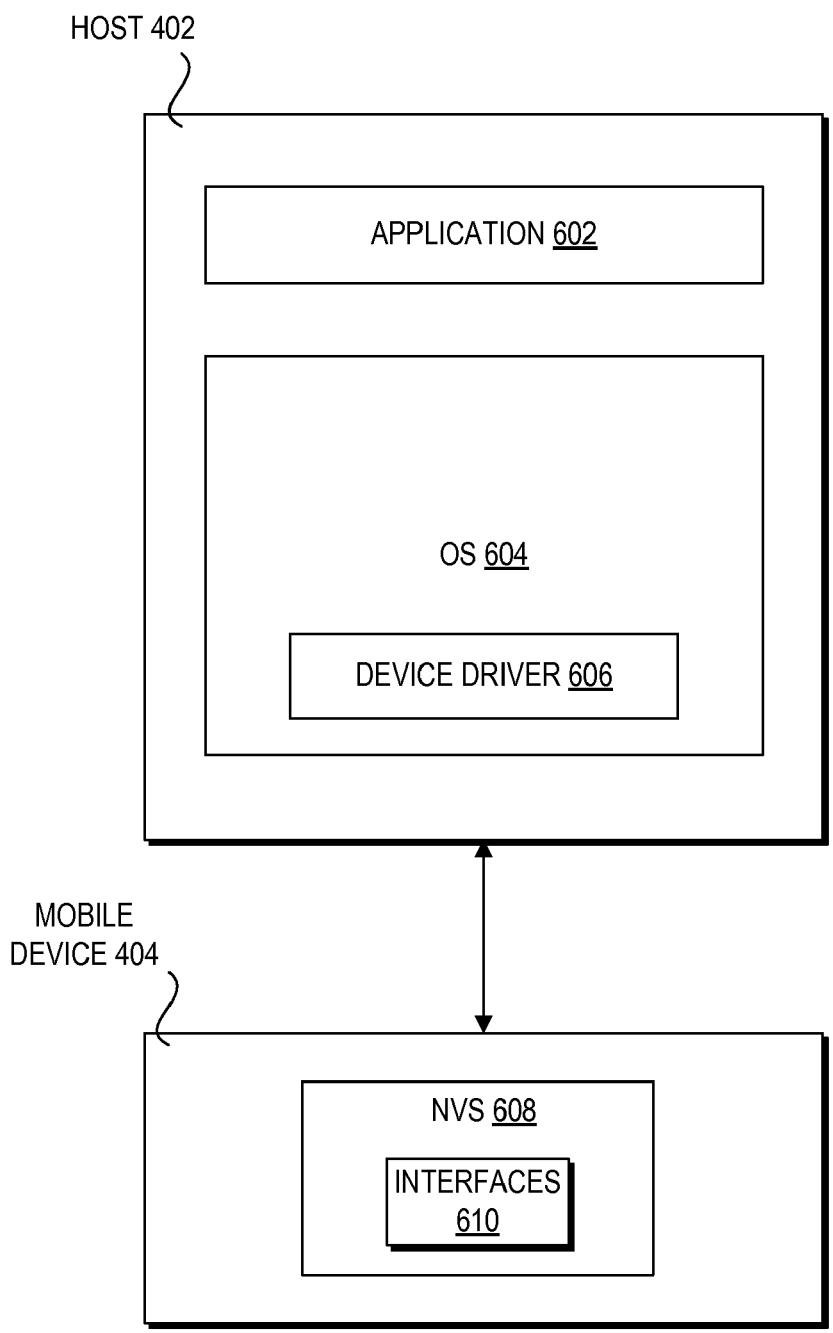
FIG. 6 is a block diagram of exposing device functions in accordance with an embodiment of the invention.

Turning to FIG. 6, another embodiment of exposing functions by the mobile device is shown. FIG. 6 shows mobile device 404 connected to host 402. Host 402 includes an application 602 supported by OS 604. OS 604 includes a device driver 606 for communicating with mobile device 404. Mobile device 404 may report to driver 606 that the mobile device 404 has available functions. The functions may be expressed using a self-describing language. Device driver 606 is aware of the self-describing language. For example, the concept of Web Services Description Language (WSDL) may be applied to exposing functions to driver 606 in the host driver stack. NVS 608 may have stored a set of interfaces 610 (that correspond to the mobile device functions) that are provided to driver 606 using the self-describing language. Driver 606 may use an interface to request mobile device 404 perform the corresponding function. In this example, specific interfaces supported by the mobile device do not need to by known by the host OS or host applications in advance (i.e., prior to connection of the mobile device). These interfaces may be discovered upon mobile device connection and then bind to the host. This example differs from other implementations in which the host would either have to have pre-loaded libraries that are compatible with the mobile device or upload a whole library on connection to the mobile device (such as discussed in FIGS. 4-5).

In one embodiment, host 402 and mobile device 404 may extend a well known protocol for exposing and calling the device functions. For example, in the case of a storage device, a Small Computer System Interface (SCSI) protocol may be extended for embodiments herein. The SCSI protocol may be extended to enable the mobile device to report the function descriptors to the host using a self-describing language. The SCSI host driver may be extended to understand these function descriptors. The extended SCSI host driver would use the self-describing language to expose these capabilities to the host OS and host applications so they can utilize the device functions. The extended SCSI host driver would report the connected mobile device to OS 604 and expose the available functions to OS 604 and application 602. When a function is requested by OS 604 or application 602, then the SCSI host driver may manage the calling of the function on the mobile device.

An embodiment of an array of descriptors 700 that may be provided by mobile device 404 is shown in FIG. 7. Array 700 includes the function name 702, input argument(s) 704, and return value(s) 706. For example, function ENCRYPT_1 encrypts a block of data from 0 to 100 KB using a provided 128-bit key. The function returns the data in encrypted form in a 0-100 KB data block.

It will be appreciated that in the embodiments of FIGS. 6 and 7, execution code for the functions is not being inserted into the host system. The code for the functions is kept on the mobile device and executed on the mobile device. Also, the calling and return of a function is kept at the driver level of host 402.

It will also be appreciated that the host device driver does not have to be updated to utilize the functions of the mobile device. The extended host device driver may query the mobile device for its functions. Since the mobile device functions are expressed in a self-describing language, the extended host device driver does not need prior knowledge of the mobile device functions to utilize those mobile device functions. This self-describing feature may differentiate embodiments of the invention from today's mobile devices that require the host to be loaded with a new driver in order to utilize the mobile device.

Embodiments of the invention are also distinguishable from Plug-and-Play (PnP). In PnP, the host OS must find a matching device driver in local storage or in a network storage in order to fully utilize the mobile device. In embodiments herein, the mobile device provides the host with the ability to utilize the mobile device's functionality. The host is not required to provide specialized device drivers for the mobile device functions.

Figure 8:
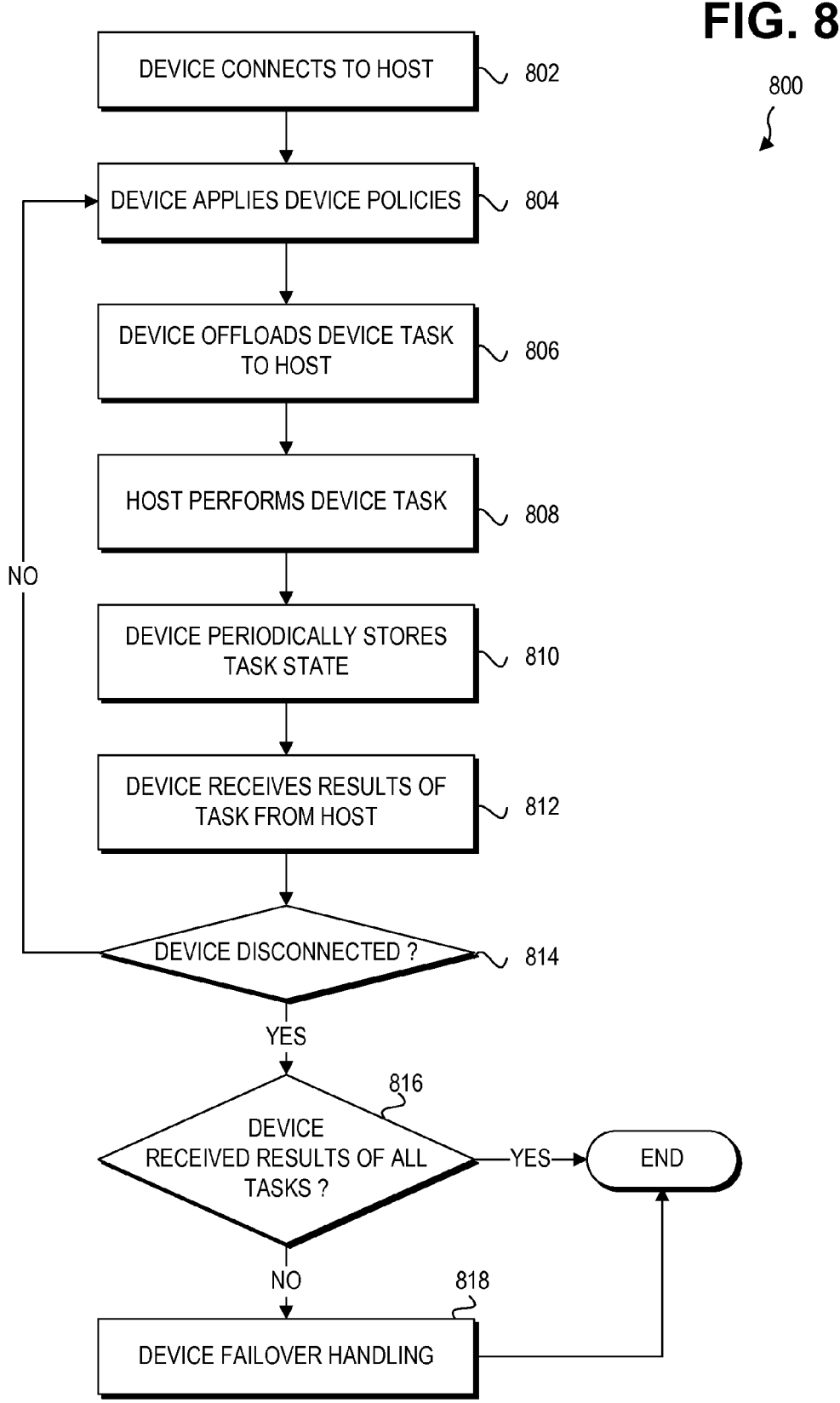
FIG. 8 is a flowchart showing the logic and operations of a mobile device offloading a device task to a host in accordance with an embodiment of the invention.

Turning to FIG. 8, a flowchart 800 shows the logic and operations of offloading a task from a mobile device to a host in accordance with an embodiment of the invention. Similarly as with flowchart 300, flowchart 800 shows the offloading of a single task, but one skilled in the art having the benefit of this description will appreciate that more than one task may be offloaded at a time from the mobile device to the host. Also, multiple mobile device tasks are not necessarily offloaded at the same time. Further, multiple device tasks may be executed by the host using batch programming.

Starting in block 802, the mobile device connects to the host. Continuing to block 804, the mobile device applies device polices. The mobile device may include modifiable policies about which tasks may be offloaded and when tasks may be offloaded. For example, device policies may require the mobile device to authenticate the host before offloading any tasks to the host. In another example, the device policies may allow offloading device tasks when the host meets particular performance thresholds, such as host processor speed.

Proceeding to block 806, the mobile device offloads the device task to the host. In one embodiment, the mobile device loads the host memory with executable code for execution on the host processor. A host executable image may be stored on the mobile device. Any data the host is to operate on may also be offloaded to the host.

In one embodiment, if the offloaded task is a continuation of a previously offloaded device task, then the offloaded device task may continue from a position indicated by saved state information (discussed further below).

Next, in block 808, the host performs the device task. For example, the mobile device may have stored numerous music files that need to be indexed. While the mobile device may have the ability to index the music files itself, the mobile device may utilize the processing power of the host if the host has a faster processor. In this example, the mobile device may include a media player, a mobile phone with media player capabilities, and the like. In another example, the mobile device may use the host for transcoding of media content stored on the mobile device. Normally, transcoding (i.e., reformatting media content for use with various applications and platforms) is a computationally expensive operation. With embodiments herein, the mobile device may use the computing power of the host for transcoding when connected to the host.

In block 810, the mobile device may periodically store the state of the device task being performed by the host. Since the mobile device is of a transient nature, the mobile device saves the task state so that the task may be offloaded and continued at a subsequent session with the host (or another host). In an alternative embodiment, the mobile device may be able to complete the task without a host by continuing from the saved task state.

Proceeding to block 812, the mobile device receives the results of the task from the host. In decision block 814, the logic determines if the mobile device has been disconnected. If the answer to decision block 814 is no, then the logic returns to block 804 to offload another task. If the answer to decision block 814 is yes, then the logic continues to decision block 816.

At decision block 816, the logic determines if the mobile device received the results of all offloaded tasks. If the answer to decision block 816 is yes, then flowchart 800 ends. If the answer to decision block 816 is no, then the logic continues to block 818 where the mobile device performs failover handling. In one embodiment, the mobile device may preserve the saved state of the task so that the next time the mobile device connects to a host, the mobile device may offload the task for completion. In another embodiment, the mobile device, if free-standing, may finish the task itself by continuing from the saved task state. In yet another embodiment, the mobile device may ignore the saved task state. In this embodiment, the task may be restarted from the beginning the next time the mobile device is connected to a host.

Embodiments of the invention provide for offloading tasks between a host and a mobile device. In one embodiment, when connected to a host, a mobile device exposes functions to the host that the host may utilize. In this way, the host may utilize the processing capability and/or specialized hardware of the mobile device for more efficiently completing host workflows. Similarly, the mobile device may offload tasks to the host for execution by the host.

Figure 9:
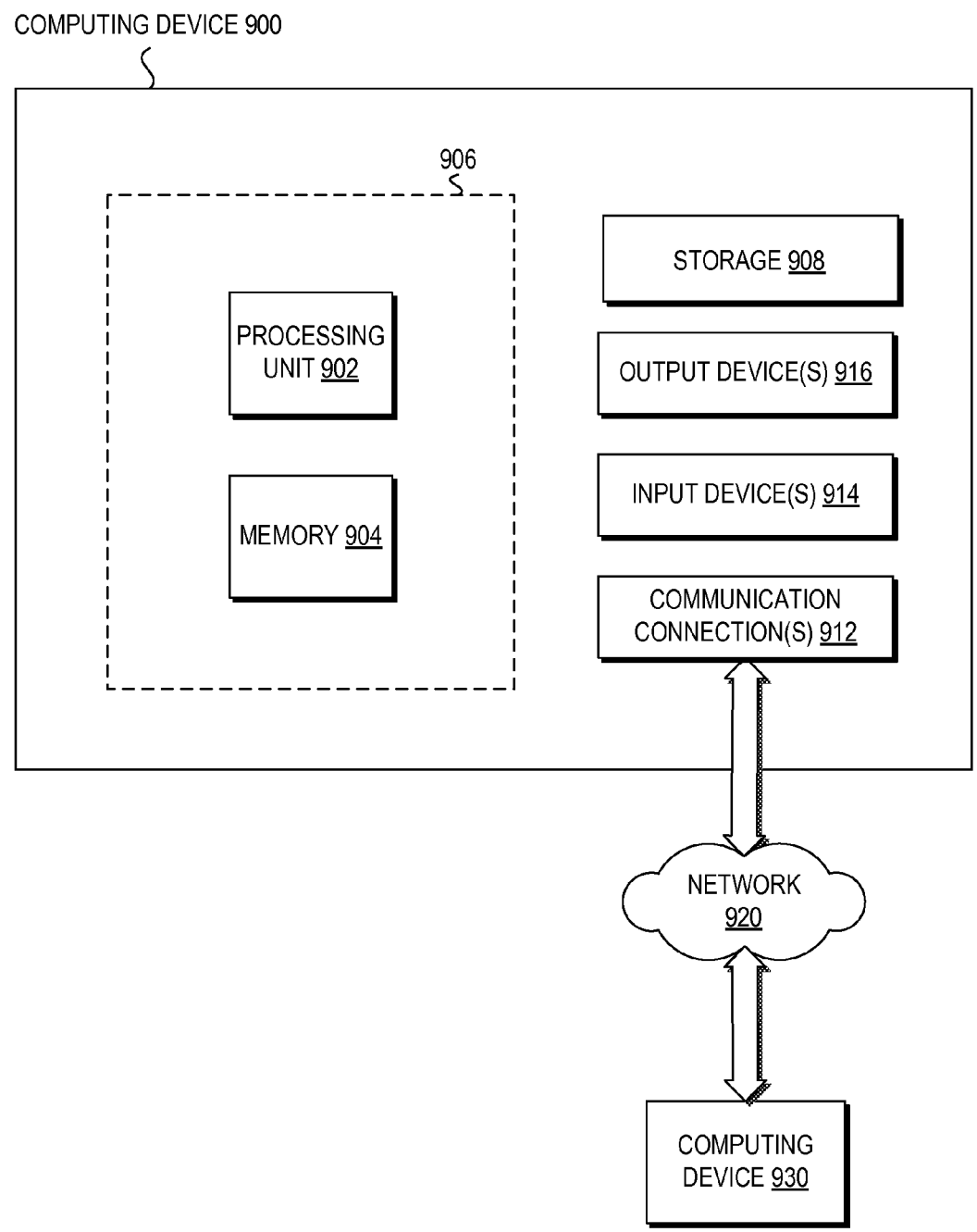
FIG. 9 is a block diagram of an example computing device for implementing embodiments of the invention.

FIG. 9 shows an example of a computing device 900 for implementing one or more embodiments of the invention. For example, host 102 or mobile device 110 may be implementations of computing device 900. In one configuration, computing device 900 includes at least one processing unit 902 and memory 904. Depending on the exact configuration and type of computing device, memory 904 may be volatile (such as RAM), non-volatile (such as ROM, flash memory, etc.) or some combination of the two. This configuration is illustrated in FIG. 9 by dashed line 906.

In other embodiments, device 900 may include additional features and/or functionality. For example, device 900 may also include additional storage (e.g., removable and/or non-removable) including, but not limited to, magnetic storage, optical storage, and the like. Such additional storage is illustrated in FIG. 9 by storage 908. In one embodiment, computer readable instructions to implement embodiments of the invention may be stored in storage 908. Storage 908 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 904 and storage 908 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 900. Any such computer storage media may be part of device 900.

Device 900 may also include communication connection(s) 912 that allow device 900 to communicate with other devices. Communication connection(s) 912 may include, but is not limited to, a modem, a Network Interface Card (NIC), or other interfaces for connecting computing device 900 to other computing devices. Communication connection(s) 912 may include a wired connection or a wireless connection. Communication connection(s) 912 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 900 may include input device(s) 914 such as keyboard, mouse, pen, voice input device, touch input device, infra-red cameras, video input devices, and/or any other input device. Output device(s) 916 such as one or more displays, speakers, printers, and/or any other output device may also be included in device 900. Input device(s) 914 and output device(s) 916 may be connected to device 900 via a wired connection, wireless connection, or any combination thereof. In one embodiment, an input device or an output device from another computing device may be used as input device(s) 914 or output device(s) 916 for computing device 900.

Components of computing device 900 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 900 may be interconnected by a network. For example, memory 904 may be comprised of multiple physical memory units located in different physical locations interconnected by a network.

Those skilled in the art will realize that storage devices utilized to store computer readable instructions may be distributed across a network. For example, a computing device 930 accessible via network 920 may store computer readable instructions to implement one or more embodiments of the invention. Computing device 900 may access computing device 930 and download a part or all of the computer readable instructions for execution. Alternatively, computing device 900 may download pieces of the computer readable instructions, as needed, or some instructions may be executed at computing device 900 and some at computing device 930. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A system comprising:
    a mobile device configured to:
        store a descriptor of a function interface, the function interface corresponding to a function executed by the mobile device, the function interface reflecting an input argument type that is processed by the function when the function is executed by the mobile device;
        expose the descriptor of the function interface to a host device, wherein the descriptor is self-describing such that the function interface is made available to the host device;
        receive, from the host device, a function call including an input argument of the input argument type reflected by the function interface;
        execute the function by processing the input argument to generate a result;
        receive a telephone call at the mobile device while the mobile device is executing the function;
        suspend the function responsive to receiving the telephone call;
        resume the function responsive to completion of the telephone call; and
        return the result of the function to the host device.

2. The system of claim 1, further comprising the host device.

3. The system according to claim 1, the mobile device comprising dedicated encryption circuitry that is configured to execute the function.

4. The system according to claim 1, the mobile device being further configured to send the function interface to the host device in a software module that is executable by the host device.

5. The system according to claim 4, the software module comprising language neutral objects.

6. The system according to claim 4, the function interface being marked as unavailable to the host device when the host device is not connected to the mobile device.

7. The system according to claim 1, wherein the function interface is discovered by the host device upon connecting to the mobile device.

8. A system comprising:
    a mobile device configured to:
        save task state information from a previous incomplete performance of a mobile device task;
        based on one or more mobile device policies, identify the mobile device task for offloading from the mobile device to a host device;
        determine a processor speed of the host device;
        identify a threshold processor speed for offloading the mobile device task from the mobile device to the host device;
        in a first instance, when the processor speed of the host device exceeds the threshold processor speed:
            offload the mobile device task from the mobile device to the host device; and
            receive a result of the mobile device task from the host device; and
        in a second instance, when the processor speed of the host device does not exceed the threshold processor speed, execute the mobile device task locally on the mobile device to generate the result,
        wherein the mobile device task is continued using the saved task state information in at least one of the first instance or the second instance.

9. The system of claim 8, further comprising the host device.

10. The system of claim 8, wherein the mobile device offloads the mobile device task by loading memory of the host device with executable code for execution by a processor of the host device.

11. The system of claim 8, the mobile device task comprising indexing music files.

12. The system of claim 8, the mobile device task comprising transcoding of media content stored on the mobile device.

13. The system of claim 8, the previous incomplete performance of the mobile device task having been performed by a different host device.

14. The system of claim 8, the previous incomplete performance of the mobile device task having been performed by the mobile device.

15. A method comprising:
   storing a software module including an interface to a function executable locally by a mobile device;
   providing the software module to a host device;
   providing one or more host policies to the host device, wherein the one or more host policies are associated with a health threshold requirement of the mobile device for executing the function;
   receiving, from the host device, a request to execute the function on the mobile device, wherein the host device provides the request by executing the software module locally on the host device to call the interface;
   executing the function in response to the request received from the host device, wherein the function is associated with a host task executing on the host device; and
   returning a result of the function to the host task executing on the host device.

16. One or more computer readable storage devices including computer readable instructions that, when executed by one or more computing devices, cause the one or more computing devices to perform the method of claim 15.

17. The one or more computer-readable storage devices of claim 16, wherein the one or more computing devices comprise the mobile device.

18. The method according to claim 15, the result comprising an encrypted block of data.

19. The method according to claim 18, wherein the interface includes a key used by the mobile device for encrypting the block of data.

* * * * *